March 27, 1934.          H. H. LINN           1,953,051
                     TRAILER CONSTRUCTION
                     Filed Oct. 1, 1930          3 Sheets-Sheet 1
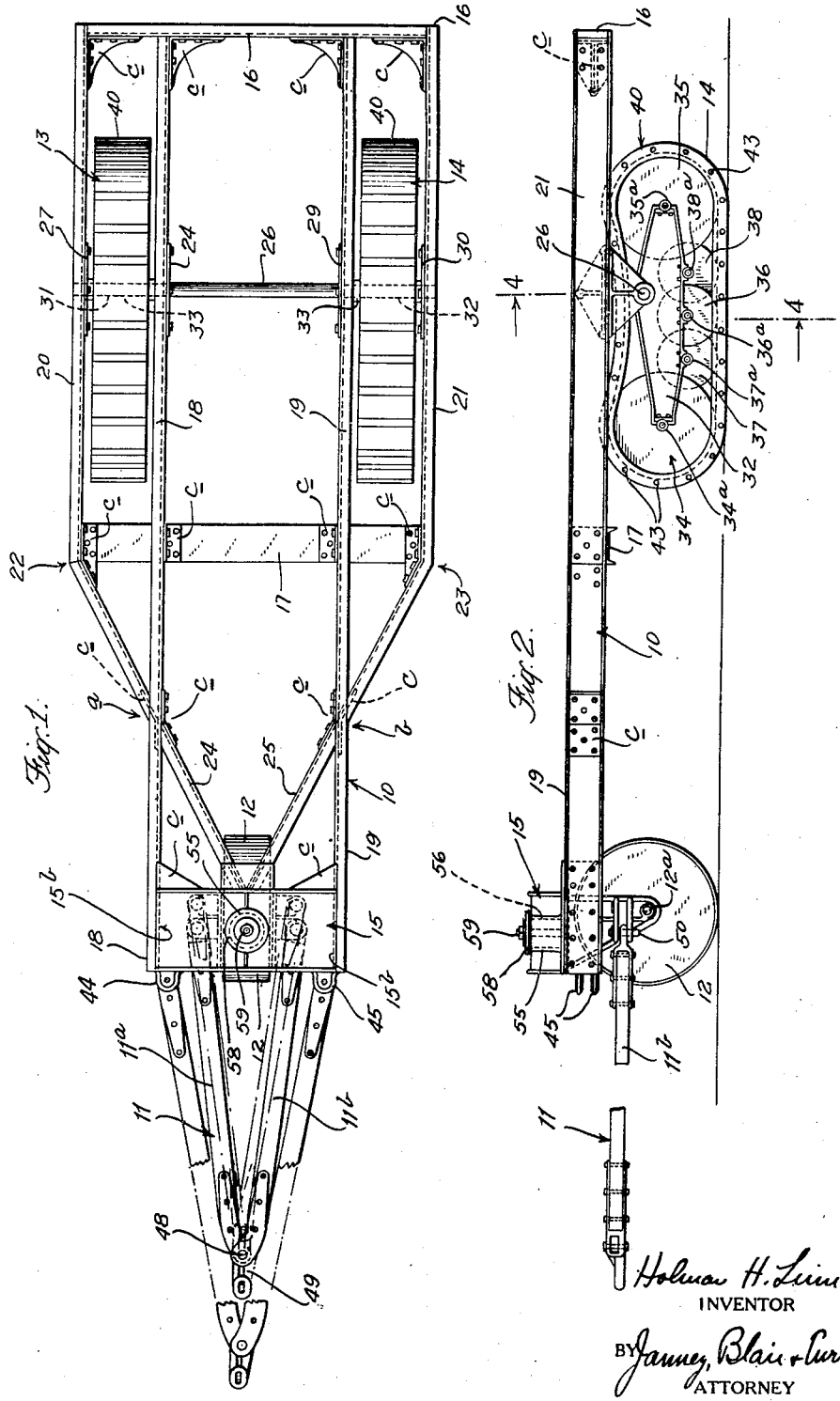

March 27, 1934.  H. H. LINN  1,953,051
TRAILER CONSTRUCTION
Filed Oct. 1, 1930   3 Sheets-Sheet 2

Holman H. Linn
INVENTOR
BY James Blair Curtis
ATTORNEY

March 27, 1934.    H. H. LINN    1,953,051
TRAILER CONSTRUCTION
Filed Oct. 1, 1930    3 Sheets-Sheet 3
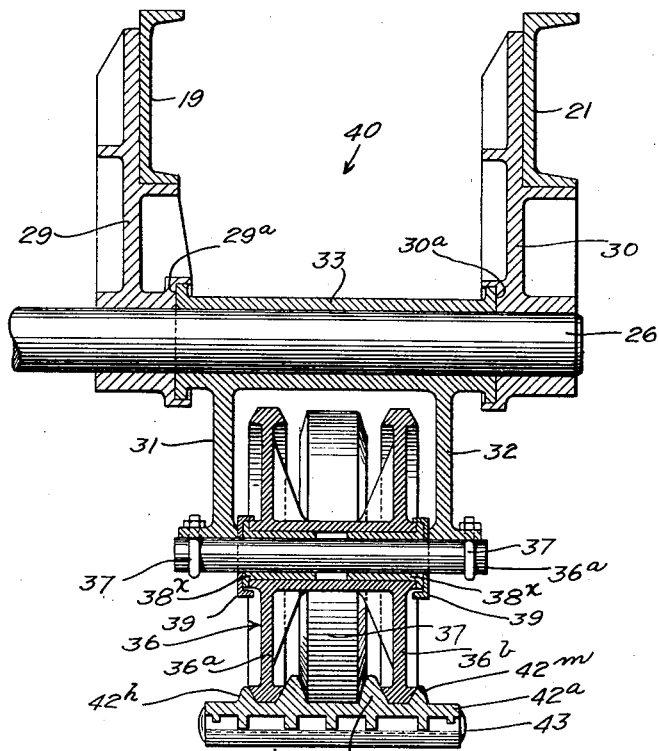
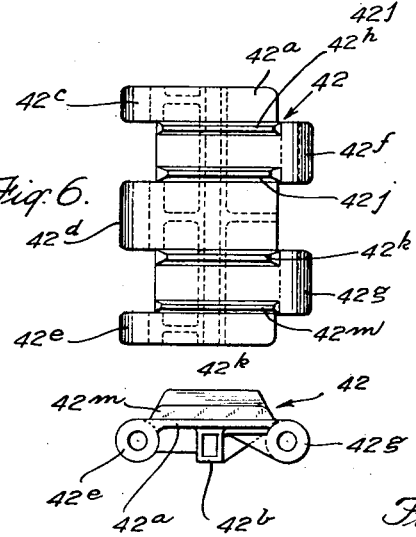
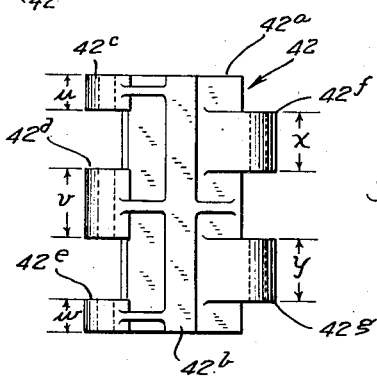
Holman H. Linn
INVENTOR
BY Janney, Blair & Curtis
ATTORNEY Patented Mar. 27, 1934

1,953,051

UNITED STATES PATENT OFFICE 1,953,051

TRAILER CONSTRUCTION

Holman H. Linn, Morris, N. Y., assignor to Linn Trailer Corporation, Oneonta, N. Y., a corporation of New York Application October 1, 1930, Serial No. 485,778

22 Claims. (Cl. 280—33.2)

This invention relates to trailer construction.

One of the objects of this invention is to provide a simple, practical and rugged trailer construction capable of dependable, efficient and lasting action in use. Another object is to provide trailer construction that lends itself readily to convenient and certain handling and control by the towing or hauling vehicle. Another object is to provide a practical and inexpensive trailer adapted either to steer itself while being towed or to be actually steered by the hauling vehicle. Another object is to provide a trailer well adapted to meet the varying and peculiar conditions of hard practical use. Another object is to provide a rugged, practical and efficient track or trailer having the above-mentioned characteristics. Another object is to provide a simple, rigid and substantially distortion-proof chassis for trailers with chassis-carrying means, well adapted to withstand hard usage and capable of reliably handling heavy loads over unfavorable road conditions. Another object is to provide a simple and compact track unit for trailers of the above-mentioned nature having maximum supporting area and load distribution, with a minimum amount of track. Another object is to provide a construction of the above-mentioned character that will dependably operate under heavy load conditions in spite of widely varying road conditions. Another object is to provide a vehicle construction well adapted to have embodied therein readily available structural steel forms or sections. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of the various possible embodiments of this invention, Figure 1 is a plan view of an assembled trailer;

Figure 2 is a side elevation thereof;

Figure 4 is a vertical cross-section of a portion of the frame and track unit as seen on an enlarged scale, along the line 4—4 of Figure 2;

Figures 6, 7 and 8 are respectively a top plan view, a bottom plan view, and an end elevation of a track or tread link embodying certain features of my invention.

Similar reference characters refer to similar parts throughout the different views of the drawings.

Figure 3:
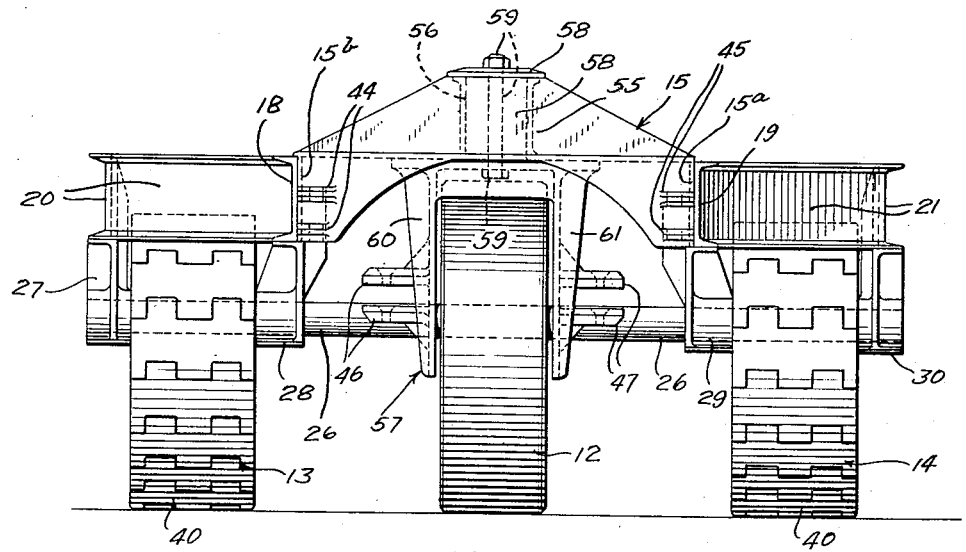
Figure 3 is a front end elevation, on an enlarged scale, of the trailer as seen from the left of Figures 1 and 2.

As conducive to a clearer understanding of certain features of my invention, it may at this point be noted that severe difficulties are met with under certain conditions of practical use in that, where a towing vehicle is towing a trailer and where the resultant train of vehicles is descending a down-grade, the hauled vehicle, particularly where it is provided with a wheel or wheels at the front end that may pivot about a vertical axis, tends to push the hauling vehicle and ride up upon the latter with the result that the trailer doubles back upon itself and in effect undergoes the phenomenon known in practice as "jack-knifing". The tendency for "jack-knifing" is accentuated as the down-grade becomes steeper and as the load carried by the trailer is increased. One of the dominant aims of this invention is to provide a trailer construction in which the tendency to "jack-knife" is greatly minimized and in which, in fact, such "jack-knifing" action may be entirely eliminated.

Referring now to Figures 1 and 2 of the drawings, I have shown a trailer construction having, generally, a frame 10, a tongue or towing means 11, a caster wheel 12 at one end, preferably the towing end, of the frame, and load-carrying track units 13 and 14 horizontally spaced at the opposite end. The frame 10 is shown (see Figure 1) as having a relatively short transversely disposed front header 15, a relatively long transversely disposed rear header 16 preferably of channel section, and a cross-beam 17 also preferably of channel section, arranged in parallel relation to these headers and crossing the frame at a point preferably forward of the midsection thereof; between the front and rear headers 15 and 16, there extends a pair of inner or main frame members 18 and 19, which are preferably also of channel section and are suitably and rigidly secured to headers 15 and 16 and to the cross-beam 17, the latter extending underneath members 18 and 19 (see Figure 2). Extending forwardly from the rear header 16, there is also a pair of outer or side frame members 20 and 21, also preferably of channel section. These members 20, 21 extend parallel to frame members 18 and 19 and forwardly from the rear header 16 (see Figure 1) to the cross-beam 17, where they are bent inwardly as at 22 and 23 and extended inwardly and forwardly to meet the front header 15, preferably along lines meeting on the longitudinal center line of the frame.

Preferably all of these longitudinally extending members (members 18, 19, 20 and 21) are disposed in the same horizontal plane, and in that case I terminate the side members 20 and 21 at the points, indicated at $a$ and $b$, where they meet the main frame members 18 and 19 and join them to the latter upon the outer sides thereof; however, the projection or continuation of these inwardly bent side frame members 20, 21 is carried out by means of additional members 24 and 25 (Figure 1) which are joined at their intersection to the front header 15 and are fastened to the main frame members 18, 19 upon the inner sides thereof.

All of these frame members are preferably made of conventional structural steel sections, preferably of channel cross-section, and at their intersections and at the points where they join the cross-members of the frame, suitable angles, plates and other forms, generally indicated at $c$, are riveted or welded or otherwise secured thereto to provide strong and rigid joints.

The front header, generally indicated at 15, as is better shown in Figures 1 and 3, extends between and is secured to the front ends of the main frame members 18 and 19, and preferably takes the form of a strong steel casting provided with side portions 15$^a$ and 15$^b$ (Figures 3 and 1) that present substantial side faces for flatwise engagement with the main frame members 18 and 19, the parts being secured together either by riveting, welding, or the like. The header 15, moreover, is arched upwardly, as is clearly shown in Figure 3, and at its central portion is bored out or otherwise suitably formed to provide a vertically extending journal 55 which thus forms a substantial bearing for the trunnion 56 of a fork 57 between the arms 60 and 61 (Figure 3) of which is mounted the wheel 12, as by means of a suitable axle 12$^a$ (Figure 2). A plate or cap 58 overlaps the upper ends of the trunnion member 56 and of the bearing portion 55, the plate 58 being held to the fork by means of the bolt 59 (Figure 3) which extends axially and centrally through the trunnion 56, thus holding the fork 57 in assembled relation with respect to the header 15.

As is clearly shown in Figures 2 and 3, the axis of the bearing 55 and the axis of the trunnion 56 extend vertically so that the fork 57 with the wheel 12 may swing about these coincident vertical axes. Furthermore, as is better shown in Figure 2, the horizontal axis about which the wheel 12 rotates, namely, the axle 12$^a$, is displaced horizontally from the vertical axis of pivoting of the fork 57, and hence the wheel 12, under conditions and circumstances more clearly described hereinafter, by "caster".

The header 15 will be seen to be of substantial and strong construction and the same is true of the fork 57. Moreover, the caster wheel 12 is preferably provided with a rather substantial width of tread. Thus, the one end, the forward end, of the trailer frame, is well supported though, as will be more clearly described hereinafter, this forward end of the trailer preferably assumes only a relatively small portion of the total load carried by the frame.

The other end of the frame, the right-hand end as seen in Figures 1 and 2, and preferably the rear end, is, as already above briefly noted, supported by what I have termed track units 13 and 14. These track units, of identical construction, coact in a peculiar and highly advantageous manner with various of the features of construction above-described; they are pivotally mounted upon a heavy cross-bar 26 which is supported crosswise of the frame members 21, 19, 18 and 20 (Figures 3 and 1) by means of heavy downwardly extending ribbed brackets 27, 28, 29 and 30, shaped to underlie and laterally overlap the channel frame members 20, 18, 19 and 21, respectively, to which they are secured by riveting, welding, or the like. These brackets, the reinforcing ribs and the interfitting of which with the channel frame members are better shown in Figure 4, are suitably bored out and alined to receive the round cross-bar 26 to which these brackets thus dependably transmit the load carried by the frame members.

The track unit 13 (Figures 1 and 3) extends lengthwise between the frame members 18 and 20 and is pivoted on that portion of the cross-bar 26 that extends between the brackets 27 and 28. The track unit 14 likewise extends between the frame members 19 and 21 and is pivoted upon that portion of the cross-bar 26 that extends between the brackets 29 and 30. Inasmuch as the construction of the track units 13 and 14 is identical, it will suffice to describe in detail one of them and reference may now be made to Figure 4 in which are shown, in vertical section, certain features of the track unit 14.

The track unit includes two horizontally spaced longitudinally extending members 31 and 32 having a shape substantially as is indicated in Figure 2, connected by a tube-like portion 33 (Figure 4) preferably integrally formed with the members 31 and 32 and bored out to fit about the cross-bar 26. The parts 31 and 32 are suitably ribbed to insure substantial strength while, as is clear from Figure 4, the portion 32 forms a substantial bushing or bearing for coaction with the cross-bar 26. The portion 33 also is preferably interfitted with the lower ends of the brackets 29 and 30, the latter being annularly recessed as at 29$^a$ and 30$^a$, respectively (Figure 4), this arrangement assisting in preventing ingress of foreign matter to the coacting bearing surfaces of the cross-bar 26 and the bearing or bushing portion 33.

Figure 5:
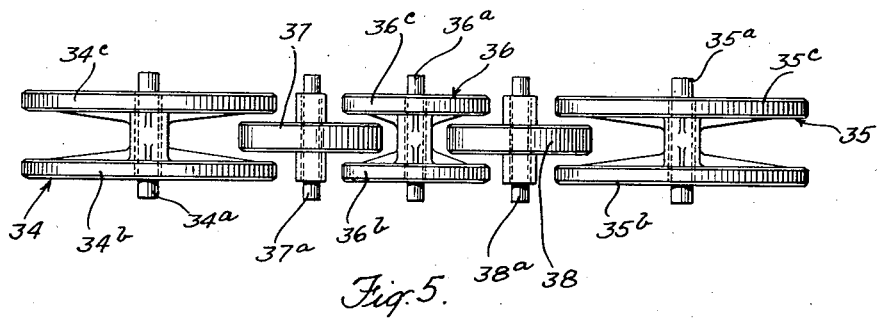
Figure 5 is a top plan view of the wheels or rollers of one of the track units showing their form and their relative positions when in assembled relation.

Mounted in the forward ends of the spaced members 31—32, as by an axle 34$^a$ (see Figure 2) is a relatively large wheel or pulley 34 shaped as indicated in the left-hand portion of Figure 5 and having therefore two tread portions 34$^b$ and 34$^c$. The axle 34$^a$ is secured in any suitable manner to the side members 31 and 32, the wheel 34 extending between these members 31 and 32. At the right-hand or rear end, as viewed in Figure 2, of the members 31—32, there is similarly mounted, as by the axle 35$^a$, a wheel 35 having also, as is indicated in Figure 5, horizontally spaced tread portions 35$^b$ and 35$^c$.

At a substantially central point in the members 31 and 32, there is rotatably supported, as by the axle 36$^a$, a wheel or pulley 36 having, like the wheels 34 and 35 and as is shown also in Figure 5, two horizontally spaced tread portions 36$^b$ and 36$^c$, the horizontally spaced tread portions of these three wheels being substantially alined, as is also clearly shown in Figure 5. The wheel 36, however, is of materially lesser diameter than the large end wheels 34 and 35 and the preferred ratio of the diameters of these wheels is substantially as indicated in the drawings.

Intermediate of the wheel 34 and the wheel 36 (Figures 2 and 5) is a wheel or pulley 37, preferably of the same diameter as the wheel 36, having a single tread that extends between the alined and horizontally spaced treads 34$^c$—36$^c$ and 34$^b$—36$^b$ of the wheels 34 and 36. The wheel 37 is rotatably mounted upon an axle 37$^a$ secured to the members 31—32.

Intermediate of the other large end wheel 35 and the wheel 36 (Figures 2 and 5) is a wheel 38, rotatably mounted upon an axle 38$^a$ secured to the members 31, 32 and having preferably a single tread that extends between the horizontally spaced treads 36$^c$—35$^c$ and 36$^b$—35$^b$ of the wheels 36 and 35, respectively, as is clearly shown in Figure 5. The diameter of this intermediate wheel 38 is preferably substantially the same as that of the double tread intermediate wheel 36.

The various axles supporting the above-described wheels of this track unit may be secured to the spaced frame parts 31—32 in any suitable manner and in Figure 4 I have illustratively shown the axle 36$^a$ secured to the members 31—32 as by U-bolts 37.

As is better shown in Figure 5, the hubs of all of these wheels are of the same axial length, fitting substantially in between the track unit frame members 31—32. Preferably, however, the hubs of these wheels are provided with anti-friction bushings, generally indicated at 38 in Figure 4, extending into the hub from each end thereof, suitable end caps 39 being provided to exclude foreign matter from the bearings and for retaining the lubricant therein.

As is clearly shown in Figure 2, the wheels 34, 37, 36, 38 and 35, though not all of the same size, are, nevertheless, so mounted that the lowermost portions of their peripheries are substantially tangent to a horizontal plane. Extending about the large end wheels 34—35 and in belt-and-pulley relation with respect thereto is a flexible or articulated endless tread or track generally indicated at 40. This track 40 is made up of a succession of plate-like sections or links, all of which are preferably of the same construction, and one of which, generally indicated at 42, is shown in detail in Figures 6, 7 and 8 and the description of the latter will suffice for all of them.

The track section or link 42 has a main plate-like body portion 42$^a$ of a width preferably materially greater than the over-all lateral dimension of the alined wheel treads of the wheels shown in Figure 5. Projecting away from the plate-like portion 42$^a$ and crosswise of that face of the track section that is to contact with the roadbed is a rib 42$^b$ (Figures 7 and 8) which serves not only to strengthen the track section 42 but also to function as a gripping bar or lug with respect to the roadbed over which the vehicle is to travel.

At the left-hand edge, as viewed in Figures 6 and 8, of the plate-like main body portion 42$^a$, and projecting downwardly from the latter in substantially the same way as the cross-rib 42$^b$ projects, are three hinge lugs or eyes 42$^c$, 42$^d$ and 42$^e$ while at the right-hand edge are two substantially similar hinge lugs or eyes 42$^f$ and 42$^g$, the latter, however, being spaced and dimensioned so as to fit in between the spaced lugs or eyes 42$^c$, 42$^d$ and 42$^e$ of the next succeeding track section, such interfitting causing these eyes or lugs to become alined and thus to form effective cross-ribs functioning like the cross-rib 42$^b$ above-described, a hinge pin 43 (Figure 4) passing through the alined apertures in these alined lugs or eyes and permitting adjacent track sections to pivot with respect to each other.

On the other face of the plate portion 42$^a$ of each track section 42 and extending in the direction of the length of the ultimate endless track are guide rails 42$^h$, 42$^j$, 42$^k$ and 42$^m$, better shown in section in the lower portion of Figure 4. Rails 42$^j$ and 42$^k$, having inclined side walls, are spaced apart sufficiently to receive therebetween the treads of the wheels 37 and 38 (see Figure 5). Guide rails 42$^h$ and 42$^j$ are spaced apart sufficiently to receive therebetween the treads 34$^c$, 36$^c$ and 35$^c$ (see Figure 5) of the wheels 43, 36 and 35. Guide rails 42$^k$ and 42$^m$ are spaced apart sufficiently to receive therebetween the treads 34$^b$, 36$^b$ and 35$^b$ of the wheels 34, 36 and 35, respectively. As the endless articulated track 40 thus moves about the pulley wheels 34 and 35 (see Figure 2) the above-described guide rails which, like the treads of the various wheels, have inclined side walls, as is clearly shown in Figure 4, dependably maintain the endless track in assembled relation with respect to the various coacting wheels and prevent the endless track from being displaced laterally of the wheels or from coming off of the wheels. These guide rails, moreover, also insure that the track is properly laid, as the vehicle moves, and in coaction with the intermediate wheels 37, 36 and 38 (see Figure 5) prevent any lateral displacement of sections of the endless track that are intermediate of the two large end wheels 34 and 35.

The major portion of the load carried by the vehicle frame is, as hereinbefore pointed out, transmitted to the track unit frame members 31—32 (see Figure 4 and Figure 2) and the latter in turn distribute the load to the inter-leaved wheels shown in Figure 5. These inter-leaved wheels in turn distribute the load to that portion of the endless track that is contacting with the roadbed. The inter-leaving of the wheels, as is illustratively indicated in Figure 5, is of great practical advantage in that I am enabled to achieve a more uniform distribution of the vehicle load to that portion of the endless track that is contacting with the roadbed than would otherwise be possible; such distribution is achieved not only lengthwise of that roadbed-contacting portion of the endless track but also transversely thereof. I am also enabled to prevent undue tensioning and over-straining of the endless track as might readily take place otherwise where the track unit or units pass over an unusually uneven roadbed.

Returning now to Figures 1, 2 and 3 of the drawings, it will be noted that the front end of the frame and preferably the front header 15 is provided with a pair of eyes 44, vertically displaced, at the left-hand end of the header 15 as viewed in Figure 3, while at the right-hand end I provide a pair of eyes 45 similarly vertically displaced. These eyes may be cast integrally with the header 15.

Referring still to Figure 3, the arm 60 of the fork 57 is provided with two vertically displaced eyes 46 and arm 61 of the fork 57 is provided with vertically displaced eyes 47, these eyes being preferably formed integrally with the fork.

By means of either set of eyes, depending upon practical conditions, I secure the coupling means that ties the trailer to the hauling vehicle; this coupling means, generally indicated in Figures 1 and 2 at 11, comprises preferably two bars or rods 11$^a$ and 11$^b$ constructed in any suitable manner so as to be both compression and tension members. The members 11ª and 11ᵇ are pivotally secured together as at 48, the connecting pin 48 having connected thereto any suitable linkage or the like as indicated at 49 to permit the jointed rods 11ª and 11ᵇ to be readily connected to the hauling vehicle.

The free or right-hand ends of the members 11ª and 11ᵇ are constructed so as to fit in between the vertically displaced eyes above-described.

When towing the trailer under load and roadbed conditions, that will not give rise to the above-described phenomenon of "jack-knifing", the free ends of the members 11ª and 11ᵇ are inserted between the eyes 46 and 47, respectively (see Figure 3) on the arms 60 and 61 of the fork 57, and secured therein as by means of a pin 50 (see Figure 2). The pivoting of the wheel 12, under these conditions, is then under the control of the towing vehicle and the trailer is steered by the hauling vehicle. Even under these conditions, should a descent of average down-grade be attempted, the coaction of the track units 13 and 14 with the wheel 12 is effective to minimize the tendency to jack-knife. This coaction follows in part from the fact that a substantial pivoting about a vertical axis of the entire frame and load is necessary to bring such jack-knifing completely into play but the track units 13 and 14, providing relatively long surfaces of contact with the roadbed, cause a substantial resistance to such sideway pivoting as will counteract this tendency to jack-knife. This action is assisted also by the substantial tractive contact of the wheel 12 at the front end of the trailer.

However, should conditions of load and roadbed be such that there is real danger of jack-knifing, the pins 50 are removed and the right-hand ends of the members 11ª and 11ᵇ are pinned in between the pairs of ears 44 and 45 on the front end of the frame, thus freeing the wheel 12 from control by the towing vehicle. The coupling device 11, under these circumstances, has been made effective to restrict the number of flexible connections between the towing vehicle and the load proper to only one, namely, that provided by the linkage 49 (Figure 1). The trailer, under these conditions, must definitely follow the movements, particularly those to the left or right of the roadway, of the towing vehicle, the wheel 12 under these conditions, simply castering and adapting itself to whatever direction of movement that the header 15 or the front end of the frame is subjected. The construction is thus entirely prevented from "jack-knifing" and the trailer is under such positive control of the hauling vehicle that most severe road conditions and heavy load conditions may be dependably and reliably met.

It will be understood that the load may be mounted on the frame in any suitable manner.

The V-like projection of the outside frame members forwardly to the header 15 serves as a lateral brace for the frame, giving it exceptional rigidity and preventing its distortion under the considerable twisting strains to which it is liable when heavily loaded, and particularly when the front end is being swung from one side to the other by the hauling vehicle. Depending upon the direction of pull angularly of the center line of the trailer, the portions 24, 22ª, 25, and 23ᵇ serve at different times as tension and compression members, thus providing a true truss formation well adapted to meet the most severe usage.

Due to various unique features of construction I am enabled to achieve highly dependable and long-lasting mechanical action of certain of the parts of the construction. For example, referring now to Figure 7, I dimension the eyes or lugs through which the hinge pin 43 (Figure 4) passes so that the sum total of the length of the lugs 42ᶜ, 42ᵈ and 42ᵉ is substantially equal to the sum total of the lengths of the lugs 42ᶠ and 42ᵍ; hence each link causes the same wear, if any, on the hinge pin 43. Thus these dimensions, indicated in Figure 7, are such that the sum of dimensions $u$, $v$ and $w$ is substantially equal to the sum of the dimensions $x$ and $y$. Preferably, each of the dimensions $u$ and $w$ is one-half of the dimension $v$.

The beveled or inclined-faced relation of the various wheels or pulleys, sometimes called "trucks", and of the guide rails 42ʰ, 42ʲ, 42ᵏ and 42ᵐ has been above described, but it may further be noted that these parts are so dimensioned that the periphery of each wheel or truck contacts with the substantially flat face of the track links while the two side inclined or beveled faces of each wheel or truck contact with the inclined side faces of the guide rails on these track links. These features insure a large surface of contact between the wheels and track and thus cut down wear; should any wear take place, however, nice interfitting and maintenance of alinement are still achieved, due to the tapered interfitting relation above-mentioned. Thus, relative lateral movement between the wheels and the flexible track is prevented even after very substantial wear has taken place and thus long life of the apparatus is further assured.

It may at this point also be noted that it is advantageous, in practice, to maintain the overall height of the vehicle as low as possible so as to achieve the practical advantages of a low center of gravity not only when the vehicle is not loaded but also when it is loaded. By placing the guide rails above-mentioned on the track links, I avoid having to increase the height of the vehicle as would be the case if the guide rails were to take the form of flanges on the wheels or trucks themselves, this latter construction necessitating an increase in the diameter of the wheels and thus an increase in the height of the vehicle; I am also enabled, in this manner, to avoid either weakening of the track links or increasing the thickness thereof as would be the case if the above-assumed flanged-wheel construction were employed in which case the track links would have to be recessed to receive the flanges on the wheels.

It will thus be seen that there has been provided in this invention a construction in which the various objects hereinbefore pointed out, together with many thoroughly practical advantages are successfully achieved. It will be seen that the construction is rugged, of dependable action, and is capable of meeting dependably a great variety of road and load conditions met with in practice. Moreover, it will be seen that the construction is well adapted to meet the varying conditions of hard practical use.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In construction of the character described, in combination, a trailer frame, supporting means for one end of the frame having at least one wheel adapted to rotate about a horizontal axis and to caster about a vertical axis, means for connecting said end of said frame to a hauling vehicle, and means associated with said frame and with said wheel adapted alternatively to have said connecting means attached thereto whereby said connecting means operates either directly on said frame or directly on said wheel in response to changes in direction of travel of the hauling vehicle.

2. In construction of the character described, in combination, a trailer frame, supporting means for one end of the frame having at least one wheel and means mounting said wheel to rotate about a horizontal axis and to caster about a vertical axis, tongue means having means for coupling it to a hauling vehicle, and means for coupling said tongue means alternatively to the said end of said frame or to said caster wheel mounting means.

3. In construction of the character described, in combination, a trailer frame, supporting means for one end of the frame comprising at least one wheel and means mounting said wheel to rotate about a horizontal axis and caster about a vertical axis, a pair of pivotally joined legs having means adjacent the juncture thereof for attachment to a hauling vehicle and means for securing the free ends of said legs either at two horizontally spaced points to said frame or at two horizontally spaced points to said caster wheel mounting means.

4. In construction of the character described, in combination, a trailer chassis comprising a frame, a fork pivotally mounted adjacent one end of said frame for rotation about a substantially vertical axis, and a wheel mounted in said fork to rotate about a horizontal axis and to swing with said fork about said vertical axis; scissors-like coupling means adapted to be connected at one end to a hauling vehicle; means on said fork to which the free ends of said coupling means may be attached, and means at horizontally spaced points on said frame to which said ends may be attached.

5. In construction of the character described, in combination, a trailer frame, a fork pivotally mounted adjacent one end of said frame for rotation about a substantially vertical axis, a wheel mounted in said fork to rotate about a horizontal axis and to swing with said fork about said vertical axis, coupling means adapted to be coupled to a hauling vehicle, said coupling means including two tension and compression members, means connecting said members at substantially the same point to a hauling vehicle, means on said fork to which the other ends of said members may be attached, and means at horizontally spaced points on said frame to which said other ends of said members may be attached.

6. In construction of the character described, in combination, a trailer chassis comprising a frame, a fork pivotally mounted centrally of one end of the frame to rotate about a substantially vertical axis, a wheel mounted in said fork, and load-supporting means including an endless movable track associated with said frame rearwardly of said fork; and means for preventing said pivotally mounted fork from acting as an articulated connection between said chassis and a hauling vehicle comprising means for coupling an end of said chassis to the hauling vehicle.

7. In construction of the character described, in combination, a trailer chassis comprising a frame, a fork pivotally mounted centrally of one end of the frame to rotate about a substantially vertical axis, a wheel mounted in said fork, and load-supporting means including an endless movable track associated with said frame rearwardly of said fork; and rigid means for coupling said chassis to a hauling vehicle, said means being adapted alternatively to be attached either to said frame so that said wheel may caster or to said fork so that said chassis is steered by said wheel.

8. In construction of the character described, in combination, a trailer chassis comprising a frame, a fork pivotally mounted at one end of the frame to rotate about a substantially vertical axis, a wheel mounted in said fork, and a pair of laterally spaced endless track units supporting said frame rearwardly of said fork; and means for preventing said pivotally mounted fork from acting as an articulated connection between said chassis and a hauling vehicle comprising means for coupling an end of said chassis to the hauling vehicle.

9. In construction of the character described, in combination, a trailer having a chassis comprising a frame, a fork pivotally mounted centrally at one end of the frame to rotate about a substantially vertical axis, a wheel mounted in said fork, and a pair of laterally spaced track units comprising load-supporting wheels and endless tracks operatively associated with said wheels, said units supporting the other end of said frame, said tracks extending lengthwise of the chassis in the direction of travel thereof and having the inherent characteristic of resisting change in direction of travel; means for coupling the trailer to a hauling vehicle, said track units, because of said characteristic, acting to resist "jack-knifing" between the trailer and the hauling vehicle.

10. In construction of the character described, in combination, a trailer having a chassis comprising a frame, a fork pivotally mounted centrally at one end of the frame to rotate about a substantially vertical axis, a wheel mounted in said fork, a pair of track units comprising load-supporting wheels and endless tracks operatively associated with said wheels, said units being positioned rearwardly of said fork, and means mounting said units for rocking movement relative to said frame, said tracks extending lengthwise of the chassis in the direction of travel thereof and having the inherent characteristic of resisting change in direction of travel; means for coupling the trailer to a hauling vehicle, said track units, because of said characteristic, acting to resist "jack-knifing" between the trailer and the hauling vehicle.

11. In construction of the character described, in combination, a trailer having a chassis comprising a frame, a fork pivotally mounted centrally at one end of the frame to rotate about a substantially vertical axis, a wheel mounted in said fork, a pair of track units comprising load-supporting wheels and endless tracks operatively associated with said wheels, said units being positioned rearwardly of said fork, and means mounting each of said units for independent rocking movement relative to said frame, said tracks extending lengthwise of the chassis in the direction of travel thereof and having the inherent characteristic of resisting change in direction of travel; means for coupling the trailer to a hauling vehicle, said track units, because of said characteristic, acting to resist "jack-knifing" between the trailer and the hauling vehicle.

12. In construction of the character described, in combination, a trailer chassis frame comprising a pair of laterally spaced inner members extending from end to end thereof, a pair of outer members extending from the rear of said frame substantially parallel to said first pair of members, upon opposite sides thereof, to a cross-beam positioned intermediate of the ends of said frame, said outer members being each extended inwardly from a point adjacent an end of said cross-beam and continued forwardly to meet and be joined to said inner members, a caster wheel, a front header joining the forward end of said inner members and providing a journal for said caster wheel, means joining the rear ends of said inner and outer members, and towing means adapted to be secured to the front of said frame.

13. In construction of the character described, in combination, a trailer chassis frame comprising a pair of laterally spaced inner members extending from end to end thereof, a pair of outer members extending from the rear of said frame substantially parallel to said first pair of members, upon opposite sides thereof, to a cross-beam positioned intermediate the ends of said frame, said outer members being each extended inwardly from a point adjacent an end of said cross-beam and continued forwardly to meet and be joined to said inner members, means connecting the forward ends of said inner members, and a pair of diagonally disposed members extending respectively between and joined to said connecting means adjacent the center line of the frame and to the inner sides of said inner frame members.

14. In construction of the character described, in combination, a trailer chassis frame comprising a pair of laterally spaced inner members extending from end to end thereof, a pair of outer members extending from the rear of said frame substantially parallel to said first pair of members, upon opposite sides thereof, to a cross-beam positioned intermediate the ends of said frame, said outer members being each extended inwardly from a point adjacent an end of said cross-beam and continued forwardly to meet and be joined to said inner members, means connecting the forward ends of said inner members, and a pair of diagonally disposed members extending respectively between and joined to said connecting means adjacent the center line of the frame and to the inner sides of said inner frame members, said diagonal members being substantially alined with the inwardly and forwardly extended portions of said outer frame members.

15. In construction of the character described, in combination, a trailer chassis frame comprising a pair of laterally spaced inner members extending from end to end thereof, a pair of outer members extending from the rear of said frame substantially parallel to said first pair of members, upon opposite sides thereof, to a cross-beam positioned intermediate the ends of said frame, said outer members being each extended inwardly from a point adjacent an end of said cross-beam and continued forwardly to meet and be joined to said inner members, means connecting the forward ends of said inner members, and a pair of diagonally disposed members extending respectively between and joined to said connecting means adjacent the center line of the frame and to the inner sides of said inner frame members, a wheel journaled in said forward end-connecting means for pivoting about a vertical axis, means for attaching said trailer to a hauling vehicle, and a pair of endless track units mounted respectively upon opposite sides of the frame between the substantially parallel portions of said inner and outer members.

16. In construction of the character described, in combination a vehicle frame comprising a pair of laterally spaced outer members extending in substantially parallel relation from the rear of the frame to a point intermediate the ends thereof and converging from said point toward the center of the frame at its front end, and a pair of spaced inner members mounted between said first members and extending in substantially parallel relation from the rear of said frame to the forward end thereof and forming angular intersections with the converging portions of said outer members, a single caster wheel, and means to which the ends of said four members are connected for supporting said caster wheel for pivoting about a substantially vertical axis.

17. In construction of the character described, in combination, a trailer chassis frame comprising a pair of laterally spaced outer members extending in substantially parallel relation from the rear of the frame to a point intermediate the ends thereof and converging from said point toward the center of the frame at its front end, a pair of spaced inner members mounted between said first members and extending in substantially parallel relation from the rear of said frame to the forward end thereof and forming angular intersections with the converging portions of said outer members, a wheel mounted at the forward ends of said four members of the frame for pivoting about a vertical axis, and a pair of endless track units mounted respectively at the sides of the frame between the substantially parallel portions of its inner and outer members.

18. In construction of the character described, in combination, a trailer chassis frame comprising a pair of laterally spaced outer members extending in substantially parallel relation from the rear of the frame to a point intermediate the ends thereof and converging from said point toward the center of the frame at its front end, a pair of spaced inner members mounted between said first members and extending in substantially parallel relation from the rear of said frame to the forward end thereof and forming angular intersections with the converging portions of said outer members, a wheel mounted at the forward end of the frame for pivoting about a vertical axis, a pair of endless track units mounted respectively at the sides of the frame between the substantially parallel portions of its inner and outer members, means for coupling said trailer to a hauling vehicle, and means for connecting said coupling means either to said frame or to said wheel mounting.

19. In construction of the character described, in combination, a vehicle chassis frame comprising a pair of laterally spaced outer members extending in substantially parallel relation from the rear of the frame to a point intermediate the ends thereof and converging from said point toward the center of the frame at its front end, a pair of spaced inner members mounted between said first members and extending in substantially parallel relation from the rear of said frame to the forward end thereof and forming angular intersections with the converging portions of said outer members, a single caster wheel supported at the ends of said frame members, and wheel means carrying an end of said frame and positioned between the substantially parallel portions of said inner and outer members.

20. In construction of the character described, in combination, a trailer chassis comprising a longitudinally extending frame, caster-supported wheel means adjacent one end of said frame, a plurality of track units positioned adjacent the opposite end of said frame, and hauling means for said trailer chassis adapted to be connected either to the first-mentioned end of said frame or to said caster-supported wheel means.

21. In construction of the character described, in combination, a trailer comprising a longitudinally extending frame, frame-supporting wheel means at one end of said frame for contacting the road at points distributed lengthwise of the direction of travel of the trailer and thereby having the characteristic of resisting change in direction of travel, and caster wheel means pivotally mounted to said frame at the other end thereof; and means for coupling said trailer to a hauling vehicle, the said characteristic of said frame-supporting wheel means cooperating to prevent "jack-knifing" of the trailer with respect to the hauling vehicle.

22. In construction of the character described, in combination, a trailer comprising a longitudinally extending frame, caster wheel means pivotally mounted to said frame at one end thereof, hauling means adapted to be attached either to said frame or to said caster wheel means, and frame-supporting wheel means at the other end for contacting the road at points distributed lengthwise of the direction of travel of the trailer and thereby having the characteristic of resisting change in the direction of travel of the trailer; and means for coupling said trailer to a hauling vehicle, the said characteristic of said frame-supporting wheel means cooperating to prevent "jack-knifing" of the trailer with respect to the hauling vehicle.

HOLMAN H. LINN.